Oct. 24, 1944.  I. M. LADDON  2,361,298
SEAL ARRANGEMENT
Filed July 21, 1942  3 Sheets-Sheet 1

Isaac M. Laddon INVENTOR.
BY James M. Clark
His Patent Attorney

Oct. 24, 1944. I. M. LADDON 2,361,298
SEAL ARRANGEMENT
Filed July 21, 1942 3 Sheets-Sheet 2
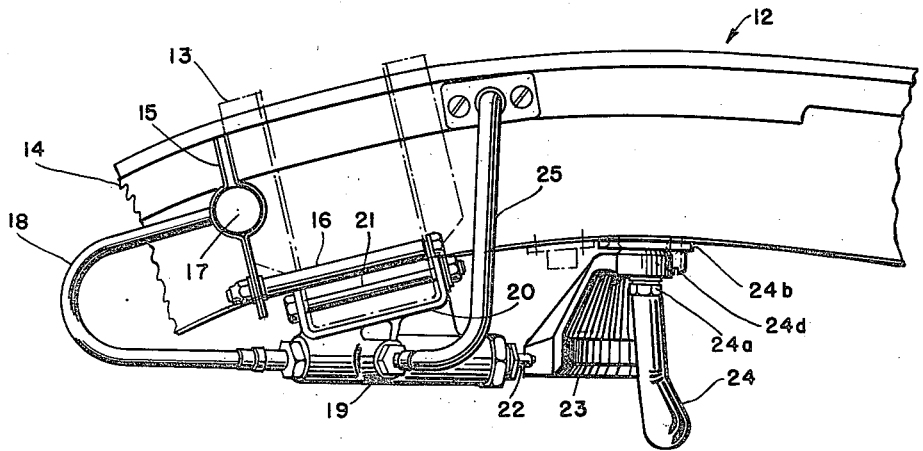
Figure 3
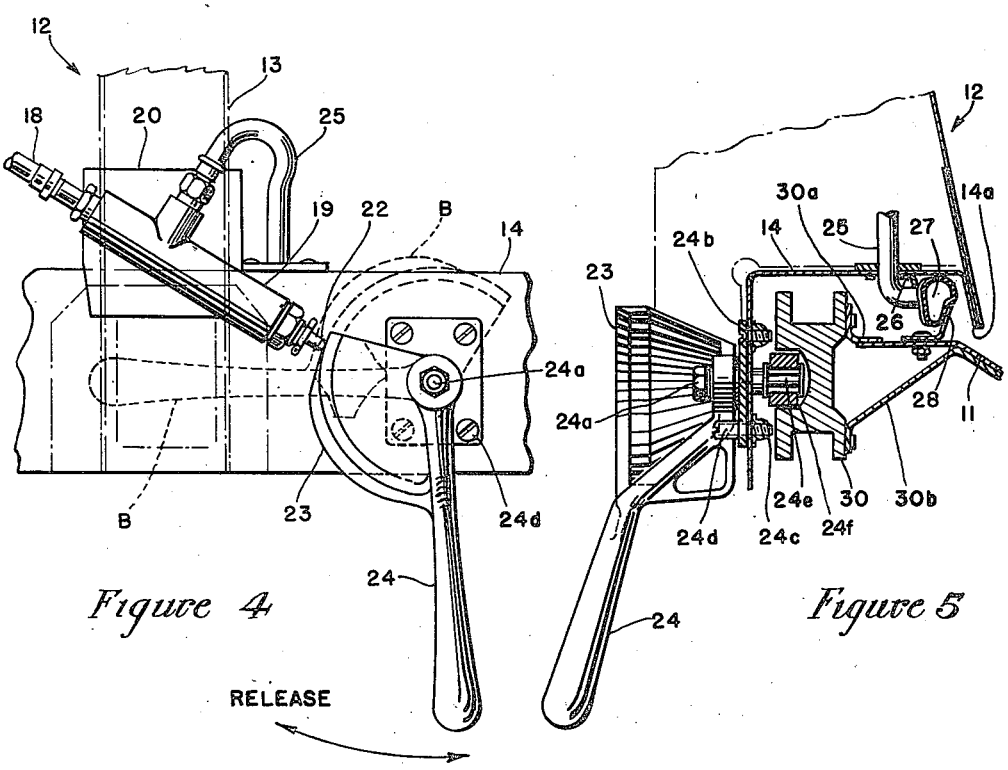
Figure 4
RELEASE ← → LOCK
Figure 5
Isaac M. Laddon INVENTOR.
BY James M. Clark
His Patent Attorney Oct. 24, 1944.   I. M. LADDON   2,361,298
SEAL ARRANGEMENT
Filed July 21, 1942   3 Sheets-Sheet 3
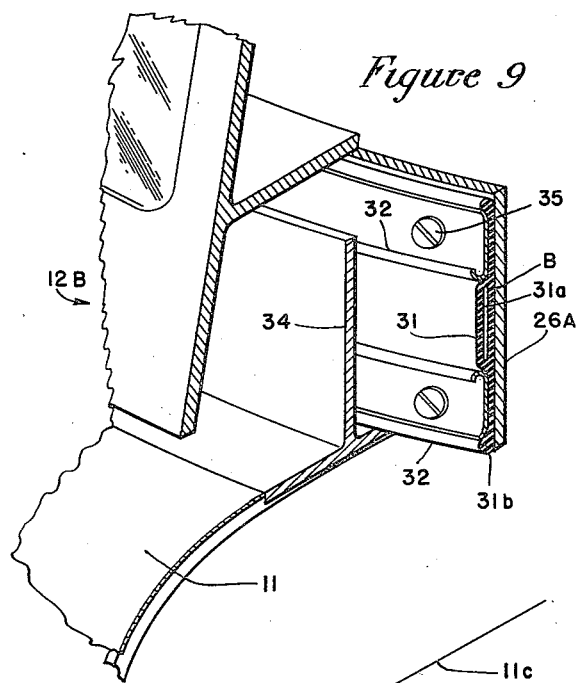
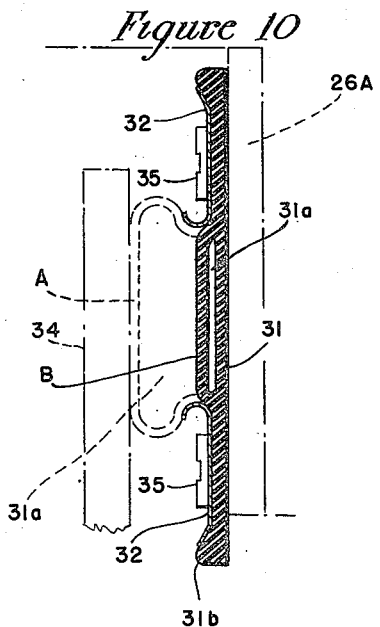
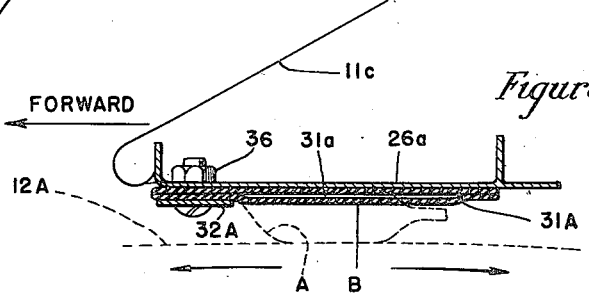
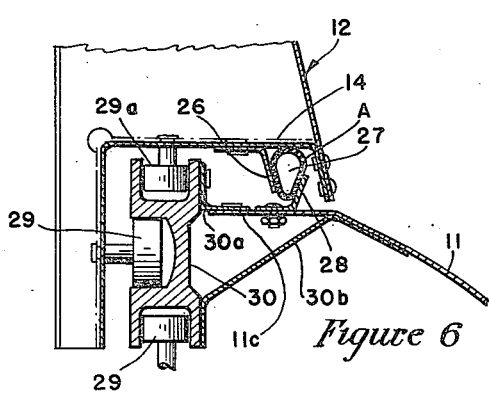
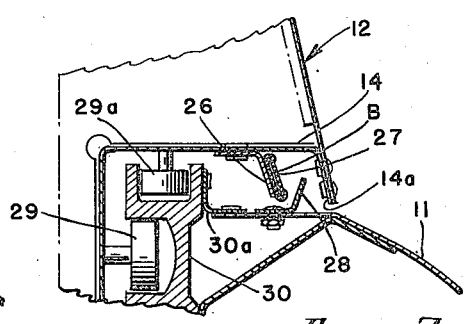
Isaac M. Laddon INVENTOR.
BY
His Patent Attorney Patented Oct. 24, 1944

2,361,298

UNITED STATES PATENT OFFICE 2,361,298

SEAL ARRANGEMENT

Isaac M. Laddon, San Diego, Calif., assignor to Consolidated Vultee Aircraft Corporation, a corporation of Delaware Application July 21, 1942, Serial No. 451,725

10 Claims. (Cl. 244—121)

The present invention relates to seals and joint constructions and more particularly to arrangements for the provision of air and water seals between relatively moving parts of aircraft, boats, tanks and other vehicles and like structures.

In aircraft construction, and particularly in military type aircraft, it is necessary that the airplane be provided with a number of ports, hatches, doors, windshields and other parts which are required to be relatively movable with respect to the fixed body of the airplane. Under various flight conditions it is necessary that the gaps or joints between these relatively movable parts and the aircraft be sealed tightly against water or air leakage through the joint as well as against the passage of rain, or snow or ice formation; and in the case of flying boats and seaplanes these joints must be sealed against the passage of salt water or spray being driven through the gap between the closure and its frame. The provision of such sealed joints are particularly desirable in high altitude or substratosphere aircraft in which the interior of the occupied portions of the aircraft is pressureized or supercharged and thereby subjects the joints to pressure differentials between the interior and the atmosphere.

The present invention is directed to the provision of an improved arrangement of inflatable seals, preferably formed of flexible or resilient materials capable of being supported upon either the closure member or its frame, and adapted to be inflated to provide a tight seal against the passage of water or air. The arrangements embraced by the present invention include the provision of a fluid pressure source, which may either be a pressure bottle or other reservoir of fluid under pressure or it may be a manually or mechanically operated air pump. A particular feature of the present invention makes provision for the automatic and positive deflation or collapse of the seal during those periods when the closure is in condition to be moved with respect to its frame in order to prevent damage to the seal.

It is accordingly a major object of the present invention to provide inflatable water or air seals for turrets, hatches, doors, windshields and other relatively moving parts in aircraft and other structures. It is a further object to provide inflatable seals of an improved design which are subjected to an initial stretching when installed such that their operation under low inflation pressures are sufficient to seal relatively large gaps gaps or joints between the movable closure and its fixed support. A further object resides in providing means to insure that the seal is automatically deflated the instant the closure is unlocked to condition it for relative movement with its support in order to prevent damage to the inflated seal. The present invention also contemplates improvements in the arrangement and details of the sealing strips and their methods of mounting as well as other features and accessories which have produced a number of simple but efficient inflatable seals for aircraft and similar structures.

Other objects and advantages of the present invention will become apparent to those skilled in the art after a reading of the present description and the accompanying drawings forming a part hereof, in which:

Fig. 3 is an enlarged plan view of the sealing mechanism indicated as applied to the turret in Fig. 1;

Fig. 4 is an elevational view of the mechanism shown in Fig. 3;

Fig. 5 is a transverse sectional view of the mechanism shown in Figs. 3 and 4;

Fig. 6 is a similar detail view of the seal at the gap between the turret and the aircraft body;

Fig. 7 is a view of the same with the seal deflated;

Fig. 8 is a detailed cross-sectional view of a modified form of inflatable seal;

Fig. 9 is a detailed view of another form of seal for the gap between a turret and the aircraft body; and Fig. 10 is a detailed cross-section of the inflatable seal shown in Fig. 9.

Figure 1:
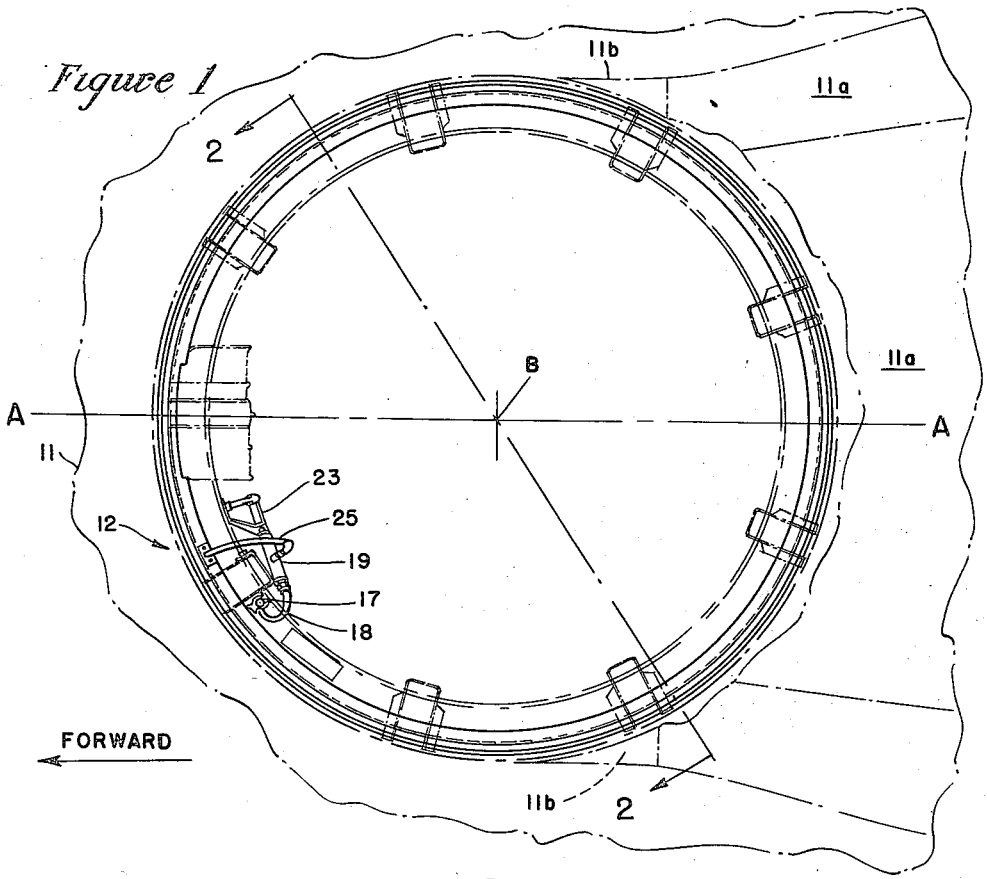
Fig. 1 is a plan view of a rotatable gun turret mounted upon an aircraft showing an application of the present invention.
Figure 2:
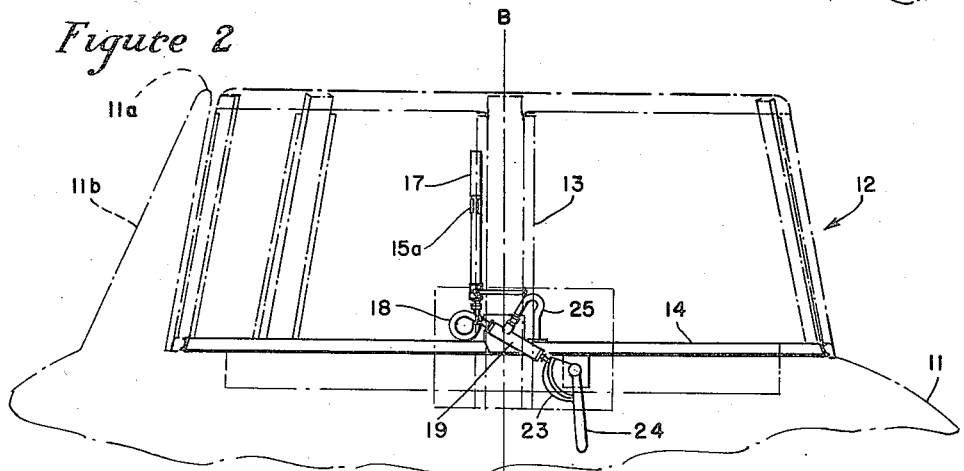
Fig. 2 is a transverse sectional view of the turret as taken along the lines 2—2 of Fig. 1.

Referring now to Fig. 1 there is indicated at 11 the deck or upper portion of the body of a flying boat to which a rotatable nose turret is shown applied. It will be understood that the present invention relates more particularly to the methods and mechanism for sealing the gaps between any movable closure parts and the body, and the selection of a gun turret applied to a military flying boat has been made for purposes of explanation only, as the invention is by no means limited to either gun turrets or to any particular type of aircraft or other vehicle. The turret 12 in the arrangement shown in Figs. 1 and 2 is of the frusto-conical type rotatable upon a vertical axis and is shown as a bow turret projecting upwardly to the elevation of the upper deck portion 11a which is faired against the sides of the turret by means of the forwardly tapered fairing portions 11b.

As more particularly shown in Figs. 1 to 5 inclusive the turret 12 is constructed upon a frame of upwardly converging channel elements 13 which support panels of Plexiglas, or other transparent or shatter-proof material within which are provided suitable apertures or slots for the training of machine guns or other aircraft armament or equipment. The side frame channels 13 are suitably fastened to a ring-shaped turret frame or base 14 which is substantially L-shaped in cross-section with a depending drop portion 14a extending downwardly to a minimum clearance space from the body or hull 11.

By means of a clamp 15 pivotally supported by the attachment bolt 16 there is a vertically disposed hand pump 17 positioned above the turret base ring 14 and in close proximity to the wall of the turret 12. The hand pump 17 communicates by means of the tube 18 with a release valve 19 having a mounting portion 20 and a T-shaped body from the outlet of which a tube 25 leads to a connection with the inflatable seal 27. The mounting portion 20 of valve 19 is secured to the channel framework 13 of the turret by means of the through bolts 21 and to which the aforementioned bolt 16 supporting the pump 17 is also preferably anchored. A spring clip 15a fastened to the channel framework 13 above clamp 15 holds the pump in a vertical or stowed position as shown in Fig. 2. Thus the pump may be released readily and swung away from the side of the turret for convenience in operation. The T-shaped body of the release valve 19 is provided with an operative release pin 22 which is continually urged outwardly by suitable spring means within the valve body to maintain contact with the cam surface 23 of the valve release and locking handle 24. The latter is rotatably mounted upon the base 24b by means of a shaft 24a. Base 24b is secured to the vertical leg of the turret ring 14 by means of mounting screws 24c. The base 24b is also provided with a stop or detent screw 24d to limit the rotation of the valve release handle 24.

The turret 12 is mounted for rotation on its vertical axis B—B by means of the horizontal and vertical rollers 29 and 29a as shown in Fig. 6 and 7 engaging the ring-shaped track 30 which is fixedly attached to the aircraft body. The turret 12 may either be rotated manually or it may be of the power-operated type now more frequently used in high performance military aircraft. As also shown in Figs. 6 and 7 it will be noted that the ring base 14 of the turret 12 has suitably riveted to the underside thereof an angle shaped element 26 extending downwardly and outwardly substantially parallel to the depending portion 14a. The skin portion of the aircraft body 11 is preferably provided with a horizontal portion 11c extending inwardly from its intersection with the projected sides of the turret 12 and has suitably fastened thereto a ring-shaped angle 30a for the support of the upper portion of the turret guide ring 30. The lower portion of the ring 30a is suitably supported by a bracket ring 30b fastened to the inner wall of the outer body skin 11. To the horizontal portion 11c of the body covering 11 there is attached a ring 28 of open angle cross section substantially similar to the support ring 26, but upwardly extending between the downwardly extending leg of the latter and the depending drop portion 14a.

A molded Neoprene or other artificial composition rubber seal or gasket 27 is bonded, cemented, or otherwise fixedly attached, while in a stretched state, to the outer face of the depending leg of the angle support 26. This pre-stretching causes the tube to be self-deflating when the pressure is released and to flatten itself against the support 26 as seen in Fig. 7. As seen in Fig. 6 when the inflatable seal 27 is subjected to internal pressure it is extended outwardly such that its outer lower portion is in sealing contact with the upstanding leg of the ring 28. In its inflated condition the seal 27 has a substantially semicircular upper portion which is in sealing contact with the lower portion of the turret base ring 14 and a downwardly tapering more sharply rounded lower portion, the outer side of which is tightly sealed against the leg of the ring 28. As shown in Fig. 7 in the deflated condition of the seal 27 it is flattened against the downwardly extending leg of the ring 26 due to its initial stretching, such that it provides ample clearance with respect to the ring 28. The surfaces of the rings 26 and 28 are frusto-conical and concentric about the vertical axis B—B of rotation of the turret which lies within the longitudinal plane of symmetry of the craft A—A.

The turret 12, shown in Figs. 1 to 7 inclusive, is rigidly locked to the support ring 30 by suitable means, that employed here being generally indicated at 24e in Fig. 5. This locking means preferably takes the form of a locking cam 24f on shaft 24a and which is disengaged from the support ring when the turret is operated, but which is brought to bear against the ring upon rotation of the locking handle 24 into the downwardly extended position shown in the full lines in the figures. In order to move the turret the handle 24 is rotated upwardly into its position B indicated by the dotted lines and in which the locking cam 24f is released to permit relative movement of the turret 12 with respect to the fixed body portion 11. As the handle 24 is rotated substantially a quarter turn in clockwise direction as viewed in Fig. 4 the cam surface 23 which is eccentric with the axis of rotation passing through the shaft 24a causes the pin 22 in the release valve 19 to be depressed and to vent the interior of the valve body such that the fluid contained within the tubular seal 27 is permitted to pass outwardly through the communicating tube 25 and the valve body 19 to the atmosphere. The turret 12 is then free to be moved manually or by suitable power means to its new position as determined by the relative position of a possible target upon which the gunner occupant of the turret desires to traverse his gun, or to which it may be moved for other purposes. It will accordingly be noted that in order to free the turret for movement the release of the air from the sealing tube 27 is also automatically accomplished in order that movement of the turret during the inflated condition of the tube, and its likelihood of damage resulting therefrom, is automatically prevented.

In order that the turret again be locked and sealed in the position into which it has been rotated it is necessary to rotate the handle 24 in a counterclockwise direction to its full line position shown in Fig. 4. This rotation again places the shorter radius portion of the cam surface 23 against the release plunger 22 of the valve 19 the outlet of which is again closed by the action of its internal spring (not shown). Rotation of the handle into its downward position has positioned the wedging surfaces of the locking cam 24f against the guide ring 30 so that the turret 12 is now again rigidly locked to the aircraft body. By means of several short strokes applied to the hand pump 17, sufficient pressure is produced within the communicating pipe 18, the valve body 19, and the tube 25 to again inflate the tubular seal 27 such that it is distended and bears tightly in sealing relationship against the lower surface of the turret base ring 14 and the inner surface of the fixed ring 28. The valve 19 is preferably of the type which incorporates a check valve feature such that the pressure which has been developed within the valve, the tube 25, and the seal 27, is retained therein, to prevent any leakage back through the pump 17 due to faulty washers, gaskets or for other reasons; the check valve within the body 19 being only released when the pin 22 is again depressed as by rotation of the cam surface 23 and the control handle 24.

Fig. 8 describes an application of one of my sealing arrangements to a bow gun turret 12A which is faired into the hull on its after sides by the triangular hull fairing portions 11c correponding generally to the fairing portions 11b in Fig. 1. The enlarged section in Fig. 8 is taken horizontally through the edge of the turret 12a which also rotates on a vertical axis in either of the directions indicated by the arrows. A fixed channel-shaped member 26a is provided within the fairing portion of the hull 11c for the support of the elastic seal 31A. This elastic seal is provided with an internal inflatable fluid space or chamber 31a and has the wider of its thickened edge portions fastened to the support frame 26a by means of the fastening screws or bolts 36 passing through the outer strip 32A. The seal 31A is connected to a suitable pressure source, such as the hand pump 17 as shown in Fig. 2, or to a bottle containing $CO_2$ or air under pressure. This seal 31A is shown in its deflated condition in the full lines indicated at B and when subjected to internal pressure is distended or distorted into the shape indicated by the dotted lines A in which it bears against the side of the bow gun turret 12A. When the internal pressure within the fluid space 31a is again released the seal collapses into its position indicated at B in which ample clearance is provided between the rotatable turret and the fairing portion of the hull.

Figs. 9 and 10 indicate the general arrangement, and an enlarged cross section of a seal for a further form of rotatable turret indicated at 12B. The frame of this turret has a vertical depending portion 26A to which is fastened a seal 31. The seal 31 is attached to the support ring 26A by means of the fastening screws 35 passing through the ring strips 32 which are bent outwardly at their outer edges to accommodate the thickened end portions 31b of the elastic seal 31, and have their inner edges rounded so as to constrict the midportion of the extended tube section without cutting or chafing the same. The enlarged beaded edges 31b of the tubular seal serve to anchor the lateral, or upper and lower, edges of the elastic strip by bearing against the outwardly bent edges of the retaining strips 32 and thereby preventing these edges from being drawn together as the seal is inflated. The fixed or body portion of the hull 11 is provided with a T-shaped ring having an upstanding stem 34, concentric with the ring 26A, and which serves as a seal plate against which the inflated tube bears to provide a sealed joint between the movable turret and the fixed ring carried upon the hull.

In each of the several modifications shown, the tubular seal has been indicated in its extended or sealing position by the full lines indicated by position A and each of the positions indicated by the letter B show the seal in its deflated or contracted condition in which the gap is open and the turret or other movable element is free to be moved or rotated with respect to the fixed hull or body portion. In each of the modifications shown the ends of the sealing strips are preferably plugged or closed, but in the case of a circular seal as in the modifications of Figs. 1 to 6, and Figs. 9 and 10, they may be of the continuously circular type. In either case, in mounting a circular type seal it is preferably initially stretched and maintained in the deflated stretched position by the sealing strips, attachment screws, bonding or other fastening means such that upon release of internal pressure the tube will of itself return to a completely collapsed condition as indicated by the letter B without the necessity of the air within the tubular section having to be exhausted from the seal by other than its own flattening effect.

As stated above, the pneumatic seals may be of molded Neoprene, Thiokol or similar artificial rubber composition which will be maintained in a live elastic condition for long periods assisted by periodic kneading and working as a result of inflation and deflation resulting from operation of the door, turret or other aircraft components for which it serves as a water or air seal. It will be preferable in a majority of installations, particularly for the sealing of the peripheries of rotary turrets to attach the rubber gasket or seal to the movable turret as shown in modifications in Figs. 5 and 10, although in installations of the type shown in the modification in Fig. 8 it will be necessary to attach the inflatable gasket to the edge of the opening within the body of the aircraft. It will be evident that this is necessary in the latter instance inasmuch as continually different portions of the exterior of the bow gun turret 12A will be positioned beside the edge of the hull fairing portion inasmuch as the edge of the latter sweeps past the entire body of revolution of the whole of the turret exterior in this modification.

It is preferable, however, in every installation in which the construction permits, to provide a deflating valve which is directly connected to the locking mechanism so that the movable portions remain at rest until the seal has been deflated in order to prevent damage thereto. By initially stressing or stretching the rubber seal or gasket it will always assume this initial position upon being deflated at which time it will lie snugly against its fastening plate to leave ample clearance between its contracted surfaces and the opposed sealing plate. Inflation of the rubber gasket can be accomplished either by means of the aforementioned hand pump, or the use of a pressure bottle of gas or other fluid may be resorted to as the extending medium, in which case suitable pressure release or regulating means should be provided to protect the rubber gaskets from undue distortion or rupture as a result of excessive internal pressures.

Other modifications and advantages of the present invention both with respect to general arrangement and detailed features which may become apparent to those skilled in the art after a reading of the foregoing specification are each intended to be embraced within the scope and spirit of this invention as more particularly defined in the appended claims.

I claim:

1. In aircraft construction, a body having an opening therein with a circular edge portion, a rotatable closure member for said opening having a circular portion spaced from the edge of said opening, means for sealing the gap between said opposed body and rotatable member edge portions comprising a normally flattened elastic element having an internal chamber, said element being attached to and co-extensive with the edge portion of said member in a deflated initially tensioned condition, and a pressure source adapted for the inflation of said element to seal said gap in each of the rotated positions of said member.

2. In aircraft construction, a pressurized body having an opening therein with a circular edge portion, a rotatable closure member movable in spaced relationship with respect to the edge of said opening such that a substantially uniform gap is created therebetween, an inflatable circular element attached to said closure member in an initially stretched state in its circumferential direction, and means for the inflation and deflation of said element whereby inflation of the same will seal said gap in each of the positions into which said closure member is rotatable, and deflation of said element will return the same to its initially flattened condition in which said gap is unsealed.

3. A seal construction for an annular gap between an aircraft body and a closure member rotatably mounted thereon, a cylindrical support element on said closure member, a cylindrical contact element on said body, said elements being concentric to the axis of rotation of said closure member to form said annular gap therebetween, manually actuated means to selectively prevent or permit rotation of said member with respect to said body, an inflatable tube circumferentially disposed and fixedly attached to said support element adjacent said gap adapted upon inflation to serve as a seal for said gap between said concentric elements, a source of pressure for the inflation of said seal, and automatic means associated with said manual actuating means adapted to interrupt said source of pressure to said inflatable seal at any of a plurality of positions at which said member is made free to rotate with respect to said body.

4. A seal construction for a gap between an aircraft body and a member movable with respect thereto comprising a normally flat inflatable seal attached to said body having an internal space of relatively great width in the direction of said gap and of a relatively small thickness in the direction across said gap, a source of fluid pressure communicating with said internal space, attachment means for fastening one of the longitudinal margins of said seal to the aircraft body and control means for subjecting said internal space to said pressure source such that said space is increased in the direction of said seal thickness and decreased in the direction of its width whereupon the central portion and the free margin of said seal is distended and separated from said body and said gap is closed by said seal.

5. A seal construction for a gap between an aircraft body and a member movable with respect thereto comprising a normally flat elastic seal longitudinally disposed with respect to said gap having an internal space of relatively great width and of a relatively small dimension in the direction of the thickness of said seal, means for locking said movable member to said body, a source of fluid pressure communicating with said internal space, means for attaching one of the longitudinal margins of said seal to the aircraft body such that the remaining margin remains free and control means for subjecting said internal space to said pressure source such that said space is increased in the direction of said seal thickness and decreased in the direction of its width accompanied by outward and lateral movements of said free margin whereupon said gap is closed by said seal.

6. A seal construction for an aircraft body having an opening therein comprising a relatively movable member adapted to serve as a closure for said body opening, mounting means for said movable member adapted for its rotation with respect to said body opening such that a uniform clearance gap is created between said member and said body, a seal supporting member having an outer surface concentric with the axis of rotation of said movable member, a contact element having an opposed surface forming said clearance gap with said seal supporting element and also concentric with said axis of rotation, a rubber composition sealing strip having a tubular core section attached while subjected to tension in its longitudinal direction to the outer surface of said supporting element such that it normally lies flat and remote from said opposed surface, a source of fluid pressure communicating with said core portion and means for subjecting said core portion to said fluid pressure such that said sealing strip is elastically distended in the region of said core portion for the closing of the gap between said concentric surfaces.

7. In aircraft construction, a fixed body, a movable member having an outer surface of revolution spaced therefrom to form a gap, an inflatable seal having a centrally disposed tube section extending longitudinally in the direction of its length, the lateral edges of the width of said seal being provided with enlarged bead portions, circumferentially disposed retaining strips, and attachment means for the fastening of said seal and strips to the said surface of revolution of said movable member intermediate each said beaded edge and said central tube section such that when said tube section is subjected to internal pressure it is distended in the direction of both its thickness and width into a sealing relationship of said gap, and said beaded edges are restrained from movement toward each other by said retaining strip.

8. In aircraft construction, an aircraft body having an opening therein, a movable member mounted upon said body adapted to serve as a closure for said body opening, an inflatable elastic seal having a tubular portion disposed between opposed surfaces of said body and said movable member, a source of fluid pressure, communicating means extending between said pressure source and said tubular seal, valve means disposed within said connecting means intermediate said pressure source and said tubular seal, manual locking means adapted to prevent relative movement of said member with respect to said body, supplemental locking means substantially co-extensively disposed with respect to said seal adapted for engagement by said manual locking means at a plurality of positions into which said member is movable, and cam means associated with said locking means adapted to cooperate with said valve means to make said pressure source ineffective upon said tubular seal when said movable member is in its unlocked relationship with respect to said aircraft body at each of said plural positions.

9. A seal arrangement for a relatively movable aircraft member having a portion contiguous to a uniform gap created therebetween and a relatively fixed supporting body, including an inflatable member attached to said movable member distensible into said gap, means to conduct fluid under pressure into said inflatable member, valve means to control fluid flow through said conducting means, retaining means carried by said body co-extensively disposed with respect to the path of movement of said movable member, and manually actuated means operatively mounted upon said movable member having a locking element engageable with said retaining means at a plurality of relative positions and an actuating portion engageable with said valve means whereby selective movement of said manual means imparts concurrent inflation of said tube for sealing said gap and locking of said movable member to said retaining means at any of said plural positions along said path of movement of said movable member.

10. A seal arrangement for a rotatable aircraft member having a portion contiguous to a uniform annular gap created between the same and an annular supporting portion of a relatively fixed body, including an inflatable annular member attached to said rotatable member in a state of initial tension such that in its deflated condition it is closely disposed with respect to said rotatable member portion and in its inflated condition is distensible to close said annular gap, means carried by said rotatable member to conduct fluid under pressure to said inflatable member, valve means adapted to control said fluid through said conducting means, a fixed annular member carried by said body concentrically and co-extensively disposed with respect to the rotational path of movement of said rotatable member, and manually actuated means operatively mounted upon said rotatable member having a locking element engageable with said fixed annular member and having an actuating portion engageable with said valve means whereby selective movement of said manual means imparts concurrent inflation of said tube for sealing said gap and locking of said rotatable member to said fixed annular means at any one of a plurality of positions along said rotational path of movement into which said rotatable member may be moved.

ISAAC M. LADDON.